June 2, 1925.
A. W. NELSON
1,540,220
SILVER CLEANING APPARATUS
Filed Jan. 22, 1925
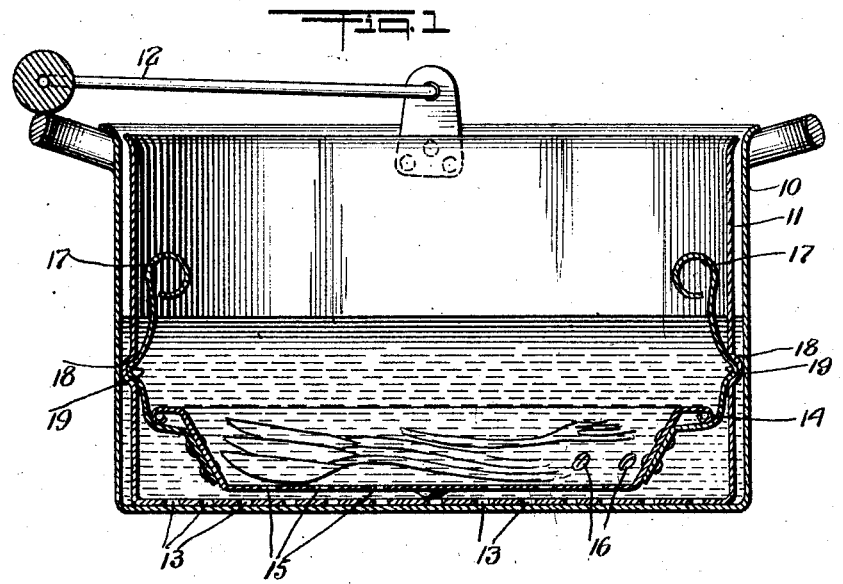
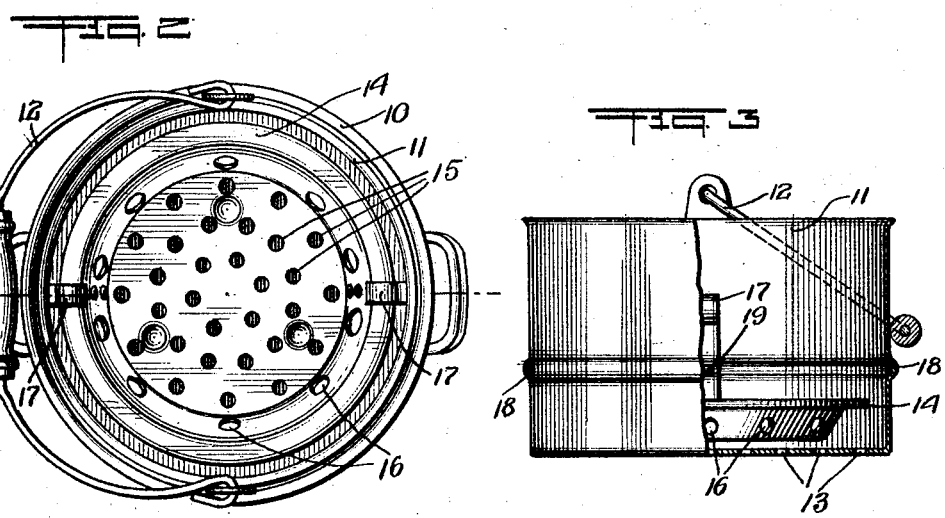
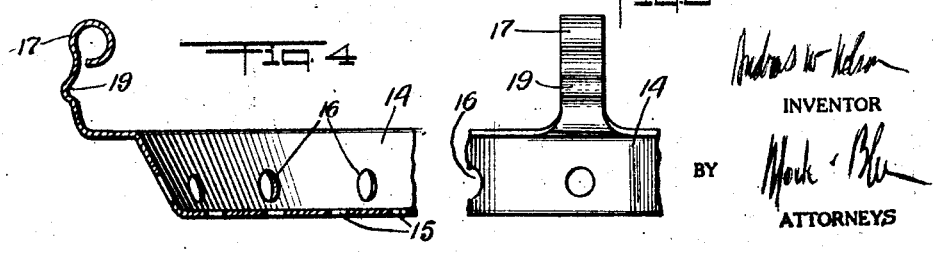
INVENTOR
BY
ATTORNEYS Patented June 2, 1925.

1,540,220

UNITED STATES PATENT OFFICE.

ANDREW W. NELSON, OF TERRE HAUTE, INDIANA, ASSIGNOR TO COLUMBIAN ENAMELING & STAMPING CO., OF TERRE HAUTE, INDIANA, A CORPORATION OF INDIANA.

SILVER-CLEANING APPARATUS.

Application filed January 22, 1925. Serial No. 3,918.

*To all whom it may concern:*

Be it known that I, ANDREW W. NELSON, a citizen of the United States, residing at Terre Haute, in the county of Vigo and State of Indiana, have invented certain new and useful Improvements in Silver-Cleaning Apparatus, of which the following is a specification.

This invention relates to silver cleaning apparatus and more particularly to that type of silver cleaning apparatus in which table and flat silverware is cleaned by immersion in a solution of salt and soda or bicarbonate of soda or similar electrolyte in combination with the use of an aluminum plate as an electrode.

A further object of this invention is to provide an apparatus of this character which is simply constructed and which may be operated with the greatest ease and efficiency.

It is well known that in the cleaning of silverware with the salt and soda solution in contact with an aluminum plate, that the operation must be carried on in a non-metallic vessel, for the same reason that in an electric battery, where two metals of differing potential are used, the vessel for the electrolyte must also be a non-conductor.

It is for this reason that the apparatus used in this particular invention is made of durable enamelware so that the electrolyte is at no time in contact with any metal, except the sheet of aluminum used in the operation and the articles to be cleansed.

Further objects of the invention will be apparent from the specification and drawings in which—

Fig. 1 is a vertical section of the complete apparatus.

Fig. 2 is a top plan view of the apparatus used.

Fig. 3 is a combination perspective and sectional view of the holder for the silver and the aluminum plate.

Fig. 4 shows a modification in the form of aluminum plate used.

Fig. 5 is a detail view of a part of the aluminum plate shown in Fig. 4.

The operation of silver cleaning is carried out as follows:

An enameled ware pot 10 is used as the exterior vessel and there is no novelty in the form of this particular container. Inside of the pot 10 fits another enameled ware vessel 11 having the handle 12 and having a series of perforations 13 in its base. The vessel 11 has a circumferential groove 18 which is for the purpose of holding the aluminum plate 14.

The plate 14 is equipped with two spring handles 17 riveted thereto which have the embossed lips 19 fitting into the groove 18 of the vessel 11. In Fig. 4 is shown a form of aluminum plate 14 in which the handle 17 is made integral with the plate 14, so no rivets are necessary in this form of aluminum plate. The plate 14 is provided with the openings 15 on the bottom thereof and 16 at the side thereof to permit the free circulation of the electrolyte which is contained in the outer container 10 and which circulates freely through the aluminum plate 14 and through the holes 13 in the bottom of the vessel 11.

The cleaning operation itself is simple and is performed as follows:

The liquid electrolyte consisting of salt and soda or a similar liquid is put into the container 10 about half filling the same and the silverware to be cleaned is put in the plate 14. The plate 14 is inserted into the vessel 11 as shown in Fig. 1 and then the vessel 11 is lowered into the container 10. When the silver or other metal to be cleaned has sufficiently brightened, the vessel 11 is removed from the container 10 and the liquid in the vessel 11 quickly drains off through the holes 13. The remaining electrolyte on the cleaned articles can be quickly washed away with hot water and the articles then can be rapidly dried.

It is thus seen that no individual handling of the silverware to be cleaned is necessary, nor is it necessary to expose the hands of the operator to the action of the liquid. The same apparatus can be used for the cleaning of other metals, such as gold plated ware and other articles.

I make no particular claims in this specification for the type of electrolyte used or for any particular metals to be cleaned, my object being to provide an efficient and economical apparatus for this process of cleaning and polishing metals.

Having fully described my invention, what I claim is:

1. In a metal cleaning apparatus, the combination of an outer vessel having a non-metallic surface, an inner vessel of smaller diameter fitting therein and having a perforated bottom and a circumferential groove in the side thereof and a perforated aluminum plate fitting into said groove by spring members attached to said plate.

2. In a metal cleaning apparatus, the combination of an outer vessel, an inner vessel fitting into said outer vessel and of less diameter, a circumferential groove in said inner vessel and an aluminum plate detachably held in said groove, said aluminum plate having springs therein integral with the body of said plate.

In testimony whereof I hereunto affix my signature.

ANDREW W. NELSON.